United States Patent
Balaji et al.

(10) Patent No.: US 11,758,473 B2
(45) Date of Patent: Sep. 12, 2023

(54) METHODS AND SYSTEMS FOR NETWORK DISCOVERY USING A FAST PARALLEL ACTIVE SCAN

(71) Applicant: Avago Technologies International Sales Pte. Limited, Singapore (SG)

(72) Inventors: Rakesh Balaji, Bangalore (IN); Sandeep PS, Bangalore (IN); Sandhya Patil, Bangalore (IN); Sridharan Parthasarathy, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 58 days.

(21) Appl. No.: 17/210,967

(22) Filed: Mar. 24, 2021

(65) Prior Publication Data

US 2022/0240166 A1 Jul. 28, 2022

(30) Foreign Application Priority Data

Jan. 28, 2021 (IN) .............................. 202121003868

(51) Int. Cl.
*H04W 48/16* (2009.01)
*H04W 72/04* (2023.01)
*H04W 72/0446* (2023.01)

(52) U.S. Cl.
CPC ....... *H04W 48/16* (2013.01); *H04W 72/0446* (2013.01)

(58) Field of Classification Search
CPC .......................... H04W 48/16; H04W 72/0446
USPC .......................................................... 370/310
See application file for complete search history.

(56) References Cited

U.S. PATENT DOCUMENTS

| | | | |
|---|---|---|---|
| 2012/0176945 A1* | 7/2012 | Hartenstein | H01Q 19/10 375/267 |
| 2017/0279479 A1* | 9/2017 | Adams | H04B 1/0483 |
| 2022/0078704 A1* | 3/2022 | Lakshmanan | H04W 52/0254 |
| 2022/0103194 A1* | 3/2022 | Rana | H04B 1/401 |

* cited by examiner

*Primary Examiner* — Faisal Choudhury
(74) *Attorney, Agent, or Firm* — Foley & Lardner LLP

(57) ABSTRACT

Systems and methods of scanning for wireless networks can use a wireless integrated package including a first radio and a second radio. The method includes providing a first probe request in a first time slot on a first channel using the first radio, and receiving a first probe response in a second time slot on the first channel using the second radio. The second time slot is at least partially contemporaneous with the first time slot. Fast parallel active scanning can be achieved.

25 Claims, 6 Drawing Sheets

METHODS AND SYSTEMS FOR NETWORK DISCOVERY USING A FAST PARALLEL ACTIVE SCAN

CROSS-REFERENCE TO RELATED PATENT APPLICATIONS

This application claims the benefit of and priority to Indian Provisional Application No. 202121003868, filed on Jan. 28, 2021, which is hereby incorporated by reference herein in its entirety.

FIELD OF THE DISCLOSURE

This disclosure generally relates to systems and methods for scanning operations in communication systems. In particular, this disclosure relates to systems and methods for discovering wireless networks by active scanning.

BACKGROUND OF THE DISCLOSURE

In the last few decades, the market for wireless communications devices has grown by orders of magnitude, fueled by the need for portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication may operate in accordance with various standards such as IEEE 802.11x, IEEE 802.11ad, IEEE 802.11ac, IEEE 802.11n, IEEE 802.11ah, IEEE 802.11aj, IEEE 802.16 and 802.16a, Bluetooth, global system for mobile communications (GSM), code division multiple access (CDMA), and cellular technologies. As higher data throughput and other needs develop, newer standards are constantly being developed for adoption. Standards can provide protocols for discovering and accessing networks.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION OF EMBODIMENTS

The following IEEE standard(s), including any draft versions of such standard(s), are hereby incorporated herein by reference in their entirety and are made part of the present disclosure for all purposes IEEE 802.11x, IEEE 802.11ad, IEEE 802.11ah, IEEE 802.11aj, IEEE 802.16 and 802.16a, and IEEE 802.11ac. Although this disclosure may reference aspects of these standard(s), the disclosure is in no way limited by these standard(s).

For purposes of reading the description of the various embodiments below, the following descriptions of the sections of the specification and their respective contents may be helpful. Section A describes a network environment and computing environment which may be useful for practicing embodiments described herein, and Section B describes embodiments of systems and methods of scanning for a wireless network. Some embodiments of the systems and methods can utilize a scanning technique for wireless network discovery that uses two or more radios. The scanning technique is a fast parallel active scan (FPAS) to access a WiFi network or other wireless network in some embodiments. The scanning technique can advantageously perform an active scan on two parallel channels by using a fast channel switch mechanism, a main radio or main core, and a scan radio or a scan core.

Some embodiments relate to a method of scanning for wireless networks using a wireless integrated package including a first radio and a second radio. The method includes providing a first probe request in a first time slot on a first channel using the first radio, and receiving a first probe response in a second time slot on the first channel using the second radio. The second time slot is at least partially contemporaneous with the first time slot.

Some embodiments relate to a wireless device. The wireless device comprises a processor. The processor is configured to provide a first probe request in a first time slot on a first channel using the first radio. The processor is configured to await reception of (e.g., listen for) a first probe response in a second time slot on the first channel using the second radio, wherein the second time slot is at least partially contemporaneous with the first time slot.

Some embodiments relate to a method of wireless communication. The method includes providing a first probe request from a first wireless device including a first transceiver circuit and a receiver circuit in single integrated circuit package. The method first probe request is in a first time slot on a first channel using the first transceiver circuit. The method also includes receiving a first probe response in a second time slot on the first channel using the receiver circuit. The second time slot is at least partially contemporaneous with the first time slot or at least partially overlaps the first time slot.

A. Computing and Network Environment

Figure 1A:
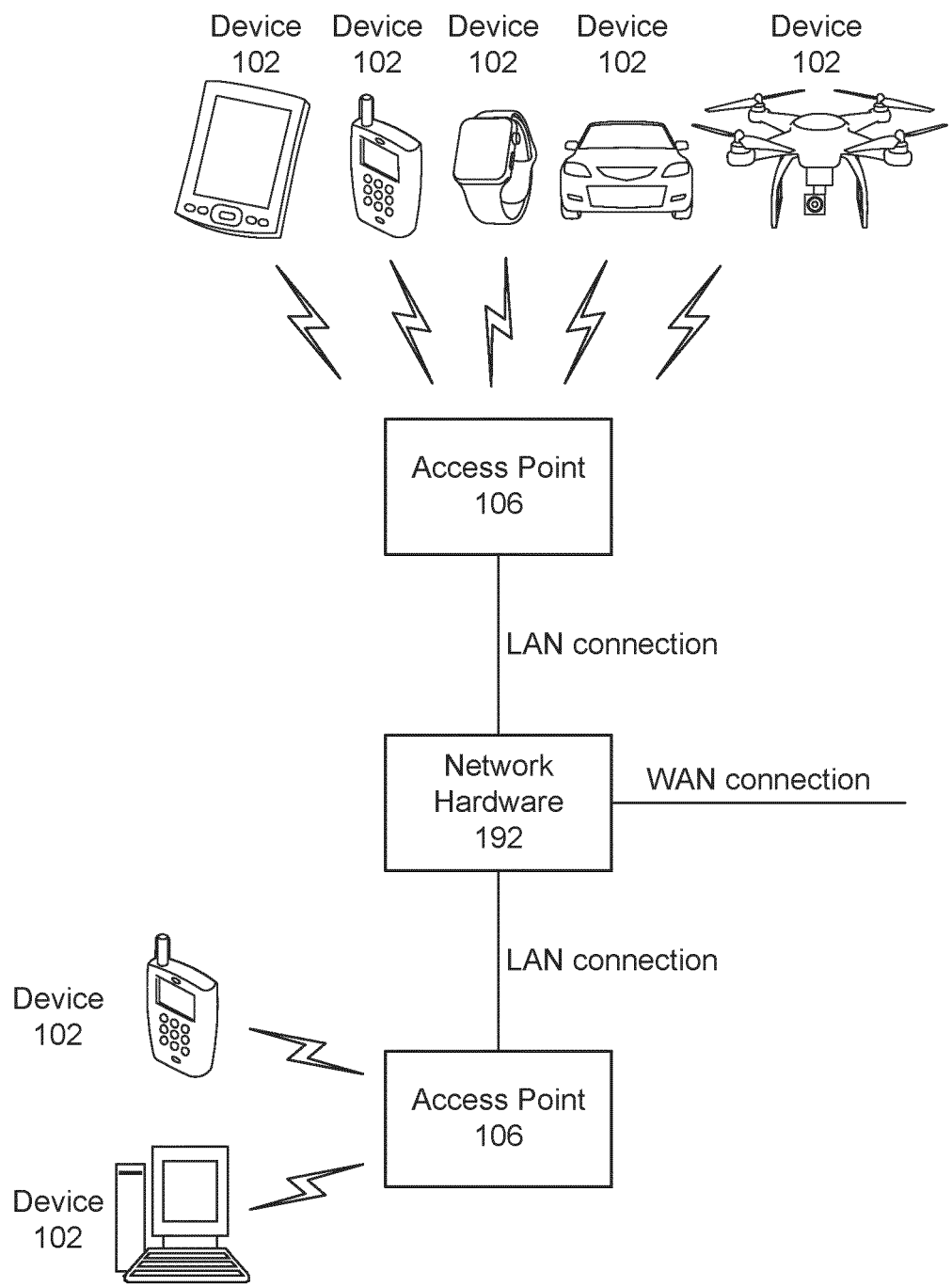
FIG. 1A is a block diagram depicting an embodiment of a network environment including one or more access points in communication with one or more wireless devices or stations.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points 106, one or more wireless communication devices 102 and a network hardware component 192. The wireless communication devices 102 may for example include laptop computers 102, tablets 102, personal computers 102, wearable devices 102, vehicles 102 (e.g., automobiles, drones, smart vehicles, robotic units, etc.) and/or cellular telephone devices 102. The details of an embodiment of wireless communication devices 102 and/or access point 106 are described in greater detail with reference to FIGS. 1B and 1C. The network environment can be an ad hoc network environment, an infrastructure wireless network environment, a subnet environment, etc. in one embodiment The access points (APs) 106 may be operably coupled to the network hardware 192 via local area network connections. The network hardware 192, which may include a router, gateway, switch, bridge, modem, system controller, appliance, etc., may provide a local area network connection for the communication system. Each of the access points 106 may have an associated antenna or an antenna array to communicate with the wireless communication devices in its area. The wireless communication devices may register with a particular access point 106 to receive services from the communication system (e.g., via a SU-MIMO or MU-MIMO configuration). For direct connections (i.e., point-to-point communications), some wireless communication devices may communicate directly via an allocated channel and communications protocol. Some of the wireless communication devices 102 may be mobile or relatively static with respect to the access point 106.

In some embodiments an access point 106 includes a device or module (including a combination of hardware and software) that allows wireless communication devices 102 to connect to a wired network using Wi-Fi, or other standards. An access point 106 may sometimes be referred to as a wireless access point (WAP). An access point 106 may be configured, designed and/or built for operating in a wireless local area network (WLAN). An access point 106 may connect to a router (e.g., via a wired network) as a standalone device in some embodiments. In other embodiments, an access point 106 can be a component of a router. An access point 106 can provide multiple devices access to a network. An access point 106 may, for example, connect to a wired Ethernet connection and provides wireless connections using radio frequency links for other devices 102 to utilize that wired connection. An access point 106 may be built and/or configured to support a standard for sending and receiving data using one or more radio frequencies. Those standards, and the frequencies they use may be defined by the IEEE (e.g., IEEE 802.11 standards). An access point 106 may be configured and/or used to support public Internet hotspots, and/or on an internal network to extend the network's Wi-Fi signal range.

In some embodiments, the access points 106 may be used for in-home or in-building wireless networks (e.g., IEEE 802.11, Bluetooth, ZigBee, any other type of radio frequency based network protocol and/or variations thereof). Each of the wireless communication devices 102 may include a built-in radio and/or is coupled to a radio. Such wireless communication devices 102 and/or access points 106 may operate in accordance with the various aspects of the disclosure as presented herein to enhance performance, reduce costs and/or size, and/or enhance broadband applications. Each wireless communication devices 102 may have the capacity to function as a client node seeking access to resources (e.g., data, and connection to networked nodes such as servers) via one or more access points.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 1B:
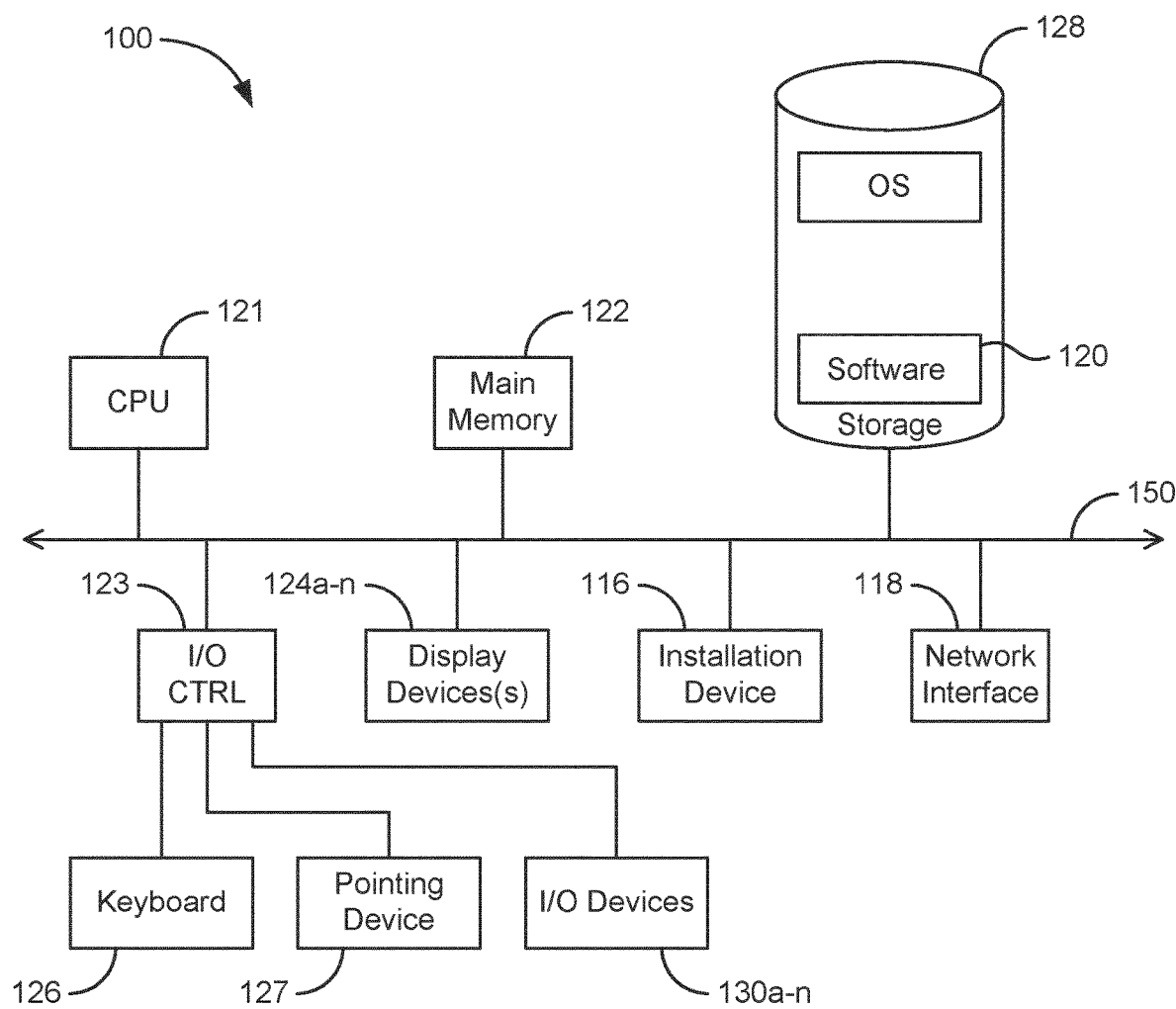
FIGS. 1B and 1C are block diagrams depicting embodiments of computing devices useful in connection with the methods and systems described herein.
Figure 1C:
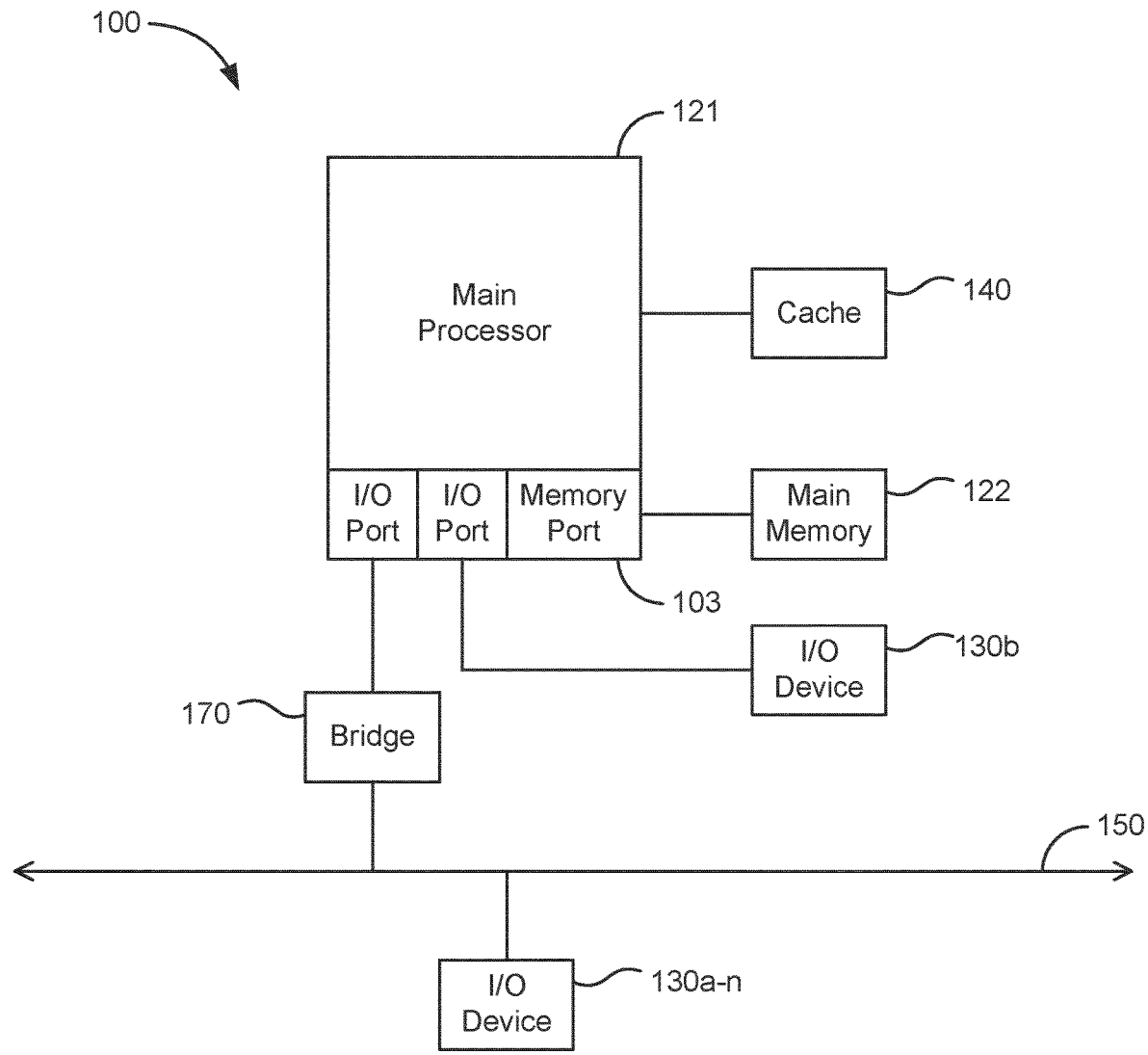

The communications device(s) 102 and access point(s) 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication device 102 or access point 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 may further include a storage device, such as one or more hard disk drives or redundant arrays of independent disks, for storing an operating system and other related software, and for storing application software programs such as any program or software 120 for implementing (e.g., software 120 configured and/or designed for) the systems and methods described herein. Optionally, any of the installation devices 116 could also be used as the storage device. Additionally, the operating system and the software can be run from a bootable medium.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may include or be connected to one or more display devices 124a-124n. As such, any of the I/O devices 130a-130n and/or the I/O controller 123 may include any type and/or form of suitable hardware, software, or combination of hardware and software to support, enable or provide for the connection and use of the display device(s) 124a-124n by the computing device 100. For example, the computing device 100 may include any type and/or form of video adapter, video card, driver, and/or library to interface, communicate, connect or otherwise use the display device(s) 124a-124n. In one embodiment, a video adapter may include multiple connectors to interface to the display device(s) 124a-124n. In other embodiments, the computing device 100 may include multiple video adapters, with each video adapter connected to the display device(s) 124a-124n. In some embodiments, any portion of the operating system of the computing device 100 may be configured for using multiple displays 124a-124n. One ordinarily skilled in the art will recognize and appreciate the various ways and embodiments that a computing device 100 may be configured to have one or more display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C may operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Systems and Methods of Scanning for a Wireless Network

Figure 2:
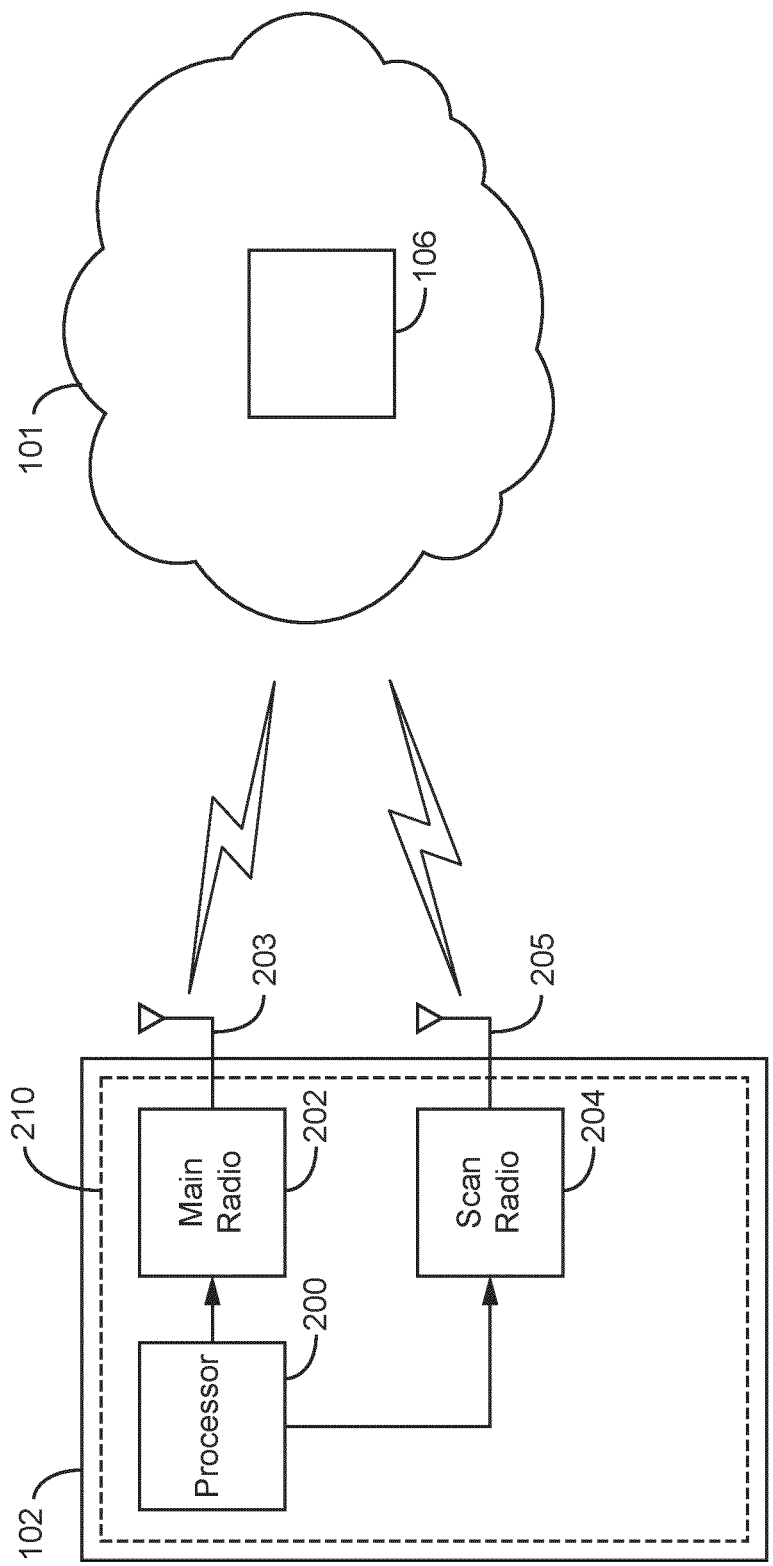
FIG. 2 is a block diagram of a communication system configured to use a scan technique for access to or discovery of a network according to some embodiments.
Figure 3A:
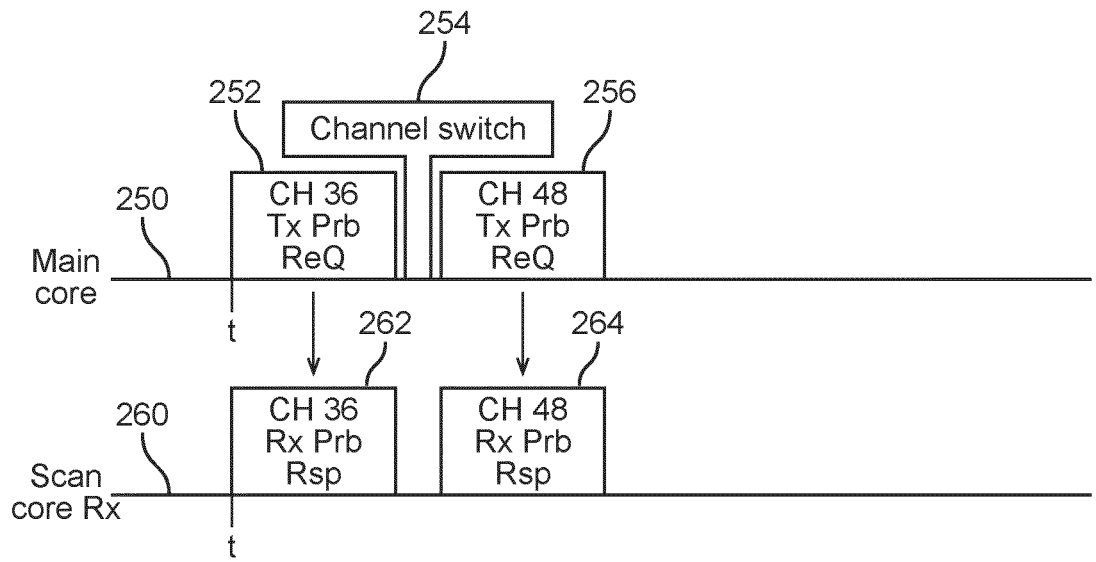
FIG. 3A is a timing diagram illustrating the scan technique for the communication system illustrated in FIG. 2 according to some embodiments.
Figure 3B:
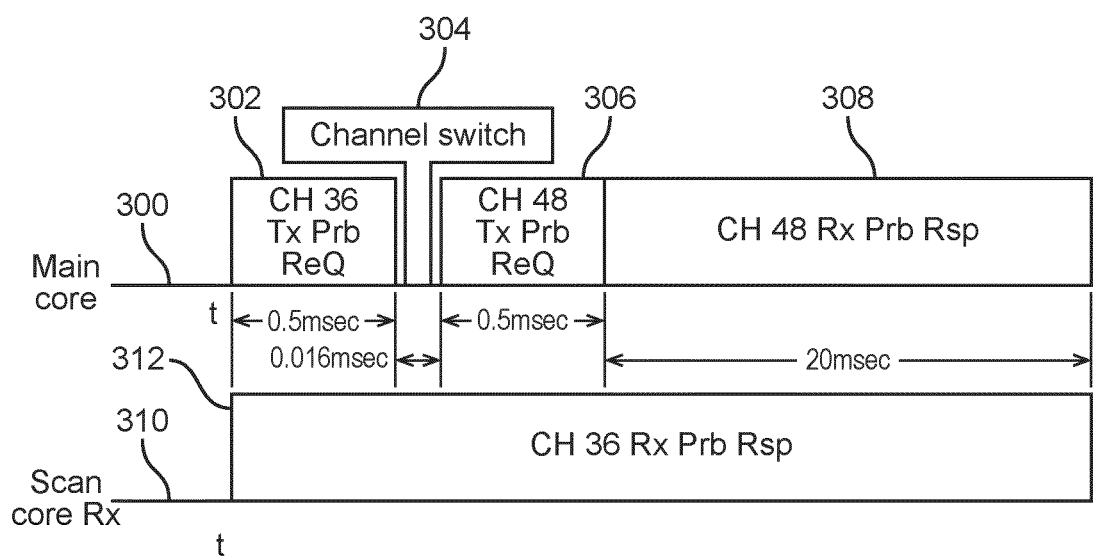
FIG. 3B is a timing diagram illustrating the scan technique for the communication system illustrated in FIG. 2 according to some embodiments.
Figure 4:
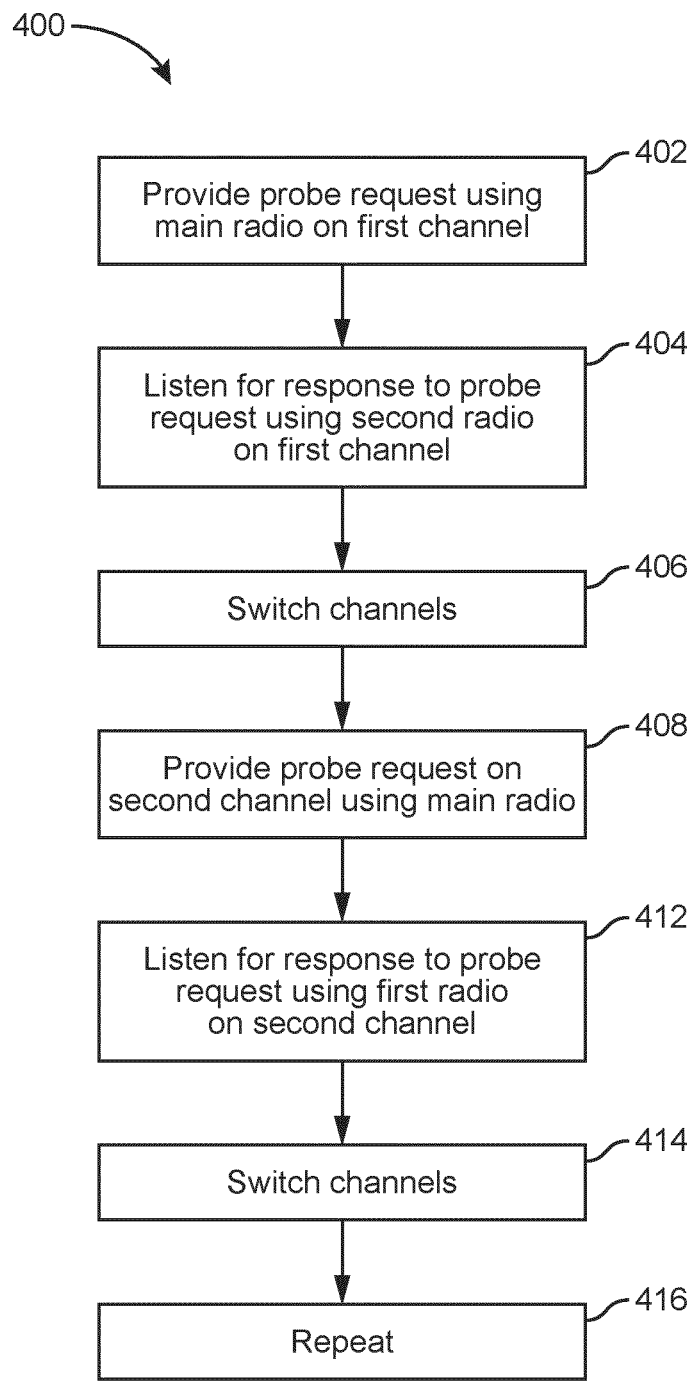
FIG. 4 is a flow diagram illustrating another embodiment of a scanning operation for the communication system illustrated in FIG. 2 according to some embodiments.

Described herein with reference to FIGS. 2-4, systems and methods are used by wireless devices 102 to scan actively for one or more wireless networks, such as wireless network 101 in some embodiments. The wireless device 102 can be one of the devices shown in FIGS. 1A-C. The wireless network 101 generally includes one or more access points such as access point 106 for wireless connectivity to wireless devices 102. In some embodiments, wireless device 102 includes a main radio 202 with an antenna 203, a scan radio 204 with an antenna 205, and a processor 200. Antennas 203 and 205 are antenna arrays, and the wireless device 102 is capable of beam forming in some embodiments.

The wireless device 102 actively broadcasts a probe request signal or the like in accordance with an active scanning technique in some embodiments. The probe request signal solicits a probe response signal from available access points, such as the access point 106. The wireless device 102 uses the probe response signal to gain access to the network 101. The interchange of the probe request and probe response signals is generally referred to as a "handshake." Conventionally, such scanning process can be time consuming. Embodiments of the system and methods described herein can reduce the time required for scanning by using the main radio 202 and the scan radio 204 at least partially simultaneously.

In some embodiments, the probe request signal provides an 802.11 frame requesting information from either a specific access point, specified by SSID, or all access points in the area, specified with the broadcast SSID. The frame can be a management frame seeking available networks on a channel. The probe request signal can be provided on each channel or a subset of channels in a sequence in some embodiments. In some embodiments, the information being requested by the probe request signal includes the supported data rates which are also included in the beacon frames broadcast from the access point 106.

In some embodiments, the access point 106 sends out a probe response signal in response to the probe request frame which was either directed to a specific access point or to all stations in the area using the broadcast SSID. Similar to a beacon frame, the probe response signal contains a frame including information required for the wireless device 102 and the access point 106 to begin communicating and/or requested by the probe request signal. The wireless device 102 can send an acknowledgement of the received probe response signal.

In some embodiments, the main radio 202, scan radio 204, and processor 200 are disposed on a single substrate 210 or in a single integrated circuit package. The package can be a multi-chip module. In some embodiments, main radio 202 and a scan radio 204 are disposed on a single substrate 210 or in a single integrated circuit package, and processor 200 is a separate integrated circuit. In some embodiments, processing functions are performed in the radios 202 and 204, and the processor 200 is a supervisory processor.

The processor 200 is implemented as a communications controller and can include memory, logic arrays, programmable gate arrays, groups of processing components, interfaces, isolation components, and filter components, analog and digital support circuits or other suitable electronic processing components in some embodiments. In some embodiments, the memory is one or more storage devices (e.g., RAM, ROM) for storing data and computer code for completing and facilitating the processes, layers, and modules described herein. The memory may be or include volatile memory or non-volatile memory.

The processor 200 is in communication with main radio 202 and scan radio 204. The processor 200 includes circuitry for controlling the radios 202 and 204, processing signals received from the radios 202 and 204, and processing signals for transmission by the radios 202 and 204. In some embodiments, the processor 200 is configured to control the radios 202 and 204 to provide the scanning operations described herein. The radios 202 and 204 provide wireless communication operations for the wireless device 102. The main radio 202 and the scan radio 204 each include radio frequency components for independently communicating wirelessly with one or more wireless networks such as wireless network 101. Main radio 202 and scan radio 204 can share certain components in some embodiments.

The radios 202 and 204 are physical layer devices in some embodiments. The radios 202 and 204 include frequency synthesizers, channel selection circuits, digital to analog converter, analog to digital converter, amplifiers, mixers, modulators, demodulators, encoders, decoders, interface, isolation, and filter components, analog and digital support circuits, beam forming circuits, or other suitable electronic processing components in some embodiments. In some embodiments, each of the radios 202 and 204 includes its own transceiver. In some embodiments, the scan radio 204 is a receive only radio.

The wireless network 101 can be any type of wireless network. For example, wireless network 101 can be a IEEE 802.11x, IEEE 802.11ad, IEEE 802.11ac, IEEE 802.11n, IEEE 802.11ah, IEEE 802.11aj, IEEE 802.16 and 802.16a, Bluetooth, global system for mobile communications (GSM), code division multiple access (CDMA), long term evolution (LTE), or a 5G network. The wireless network 101 can be a permanent network, a temporary, or an ad hoc network.

Referring to FIGS. 2 and 3A, the wireless device 102 performs a fast parallel active scan operation to discover and join wireless networks such as wireless network 101. The wireless device 102 transmits a probe request on a first channel (e.g., channel 36) at a time t on an X-axis 300 using the main radio 202. The X-axis 300 represents time. The transmission of the transmit probe request occurs in a time slot 252. In some embodiments, the time slot 252 is a predetermined length of time (e.g., 0.5 milliseconds, 0.25 milliseconds, 1 milliseconds, etc.). At time t or just after time t, the wireless device 102 listens for or awaits for reception of a probe request response in a time slot 262 on the first channel (e.g., channel 36) using the scan radio 204. Time for the scan radio 204 is represented on an X-axis 260. The time slot 262 is a fixed time slot that is the same length as the time slot 252 (e.g., approximately 0.5 milliseconds) in some embodiments. The time slot 262 at least partially overlaps or is at least partially contemporaneous with the time slot 252 (e.g., for approximately 0.5 milliseconds) in some embodiments.

After time slot 252 and 262 expire, a channel switch operation occurs in the main radio 202 and the scan radio 204 in a time slot 254. The channel switch operation occurs in 0.016 milliseconds or less in some embodiments. The channel switch operation can involve adjusting the frequency synthesizer of the main radio 202 to provide an appropriate frequency for the new channel. The channel switch operation causes the main radio 202 and the scan radio 204 to operate using a second channel (e.g., channel 48). After the time slot 254, the wireless device 102 transmits another probe request on the second channel (e.g., channel 48) using the main radio 202. The time slot 256 is a fixed period (e.g., 5 milliseconds) in some embodiments. After the time slot 262, the wireless device 103 listens for or awaits for reception of a probe request response in a time slot 264 on the second channel (e.g., channel 48) using the scan radio 204. The time slot 264 at least partially overlaps or is at least partially contemporaneous with the time slot 256 (e.g., for approximately 0.5 milliseconds) in some embodiments. Time slot 264 is a fixed period (e.g., 0.5 milliseconds) in some embodiments. Time slot 264 has the same length as time slot 256 in some embodiments. In some embodiments, the time slots 252, 254, 262, and 264 are not fixed and are set based upon configuration parameters or network settings.

Processor 200 controls the main radio 202 and scan radio 204 to achieve fast parallel active scan operations in some embodiments. Fast parallel active scan operations save time by transmitting the probe request on a another channel without needing to wait a full dwell time on each channel to receive a probe response and by switching the channel to transmit the next probe request in the next channel in some embodiments. The scanning sequence can be repeated until all channels are scanned. In some embodiments, the fast parallel active scan operations reduce the active scan duration by more than 40 percent or approximately 50 percent. In some embodiments, the fast parallel active scan operations are used for 2 Gigahertz (GHz) and/or 5 GHz scans. In some embodiments, 6 GHZ scans can be utilized. The first channel and the second channel are WiFi channels in some embodiments.

Referring to FIGS. 2 and 3B, the wireless device 102 performs a fast parallel active scan operation to discover and join wireless networks such as wireless network 101 similar to the operation discussed with reference to FIG. 3A. The wireless device 102 transmits a probe request on a first channel (e.g., channel 36) at a time t on an X-axis 300 using the main radio 202. The X-axis 300 represents time. The transmission of the transmit probe request occurs in a time slot 302. In some embodiments, the time slot 302 is a predetermined length of time (e.g., 0.5 milliseconds, 0.25 milliseconds, 1 milliseconds, etc.). At time t or just after time t, the wireless device 102 listens for or awaits for reception of a probe request response in a time slot 312 on the first channel (e.g., channel 36) using the scan radio 204. Time for the scan radio 204 is represented on an X-axis 310. The time slot 312 is a fixed time slot that is longer than the time slot 302 (e.g., approximately 21 milliseconds) in some embodiments. The time slot 312 at least partially overlaps or is at least partially contemporaneous with the time slot 302 (e.g., for approximately 0.5 milliseconds) in some embodiments.

After time slot 302 expires, a channel switch operation occurs in the main radio 202 in a time slot 304. The channel switch operation occurs in 0.016 milliseconds or less in some embodiments. The channel switch operation causes the main radio 202 to operate using a second channel (e.g., channel 48). In some embodiments, the scan radio 204 remains at the first channel. At a time slot 306 after the time slot 304, the wireless device 102 transmits another probe request on the second channel (e.g., channel 48) using the main radio 202. Time slot 306 is a fixed period (e.g., 0.5 milliseconds) in some embodiments. After the time slot 306, the wireless device 102 listens for or awaits for reception of a probe request response in a time slot 308 on the second channel (e.g., channel 48) using the main radio 202. The time slot 312 at least partially overlaps or is at least partially contemporaneous with each of the time slots 304, 306 and 308 in some embodiments. The time slot 308 is a fixed period (e.g., 20 milliseconds) in some embodiments. The time slot 306 is a fixed period (e.g., 0.5 milliseconds) in some embodiments. In some embodiments, the time slots 302, 304, 308, and 312 are not fixed and are set based upon configuration parameters or network settings. In some embodiments, the first channel is in a lower frequency band (e.g., 2 GHz) and the second channel is on a higher frequency band (e.g., 5 GHz). In some embodiments, the scan radio 204 is operational in the lower frequency band only or is operational over a smaller bandwidth than the main radio 202.

Referring to FIGS. 2, 3A-B, and 4, a flow 400 can be performed by wireless device 102 to discover a wireless network, such as the wireless network 101, according to some embodiments. At an operation 402, the wireless device 102 transmits a probe request on a first channel using the main radio 202. At an operation 402, the wireless device 102 listens for a response to the probe request on a first channel using the scan radio 204. At an operation 406, the wireless device 102 switches channels to a second channel.

At an operation 408, the wireless device 102 transmits another probe request on a second channel using the main radio 202. At an operation 412, the wireless device 102 listens for a response to the probe request on the second channel using the scan radio 204. In some embodiments, at the operation 412, the wireless device 102 listens for a response to the probe request on the second channel using the main radio 202 while the scan radio 204 listens for the probe request on the first channel in operation 404. At an operation 414, the wireless device 102 switches channels to a third channel. At an operation 416, flow 400 is repeated until all channels are scanned. Channels can include 2 GHz channels of 1, 2, 3, 4, 5, 6, 7, 8, 9, 10, and 11 and 5 GHZ channels of 36, 40, 44, 48, 144, 149, 153, 157, 161, and 165 in some embodiments.

Although the disclosure may reference one or more "users", such "users" may refer to user-associated devices, for example, consistent with the terms "user" and "multi-user" typically used in the context of a multi-user multiple-input and multiple-output (MU-MIMO) environment. Although examples of communications systems described above may include wireless devices and access points operating according to an 802.11 standard, it should be understood that embodiments of the systems and methods described can operate according to other standards and use wireless communications devices other than devices discussed herein. For example, multiple user communications capable interfaces associated with cellular networks, satellite communications, vehicle communication networks, and other non-802.11 wireless networks can utilize the systems and methods described herein to achieve improved scanning without departing from the scope of the systems and methods described herein.

It should be noted that certain passages of this disclosure may reference terms such as "first" and "second" in connection with devices, number of bits, transmission durations, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method of scanning for wireless networks using a wireless integrated circuit package comprising a first radio and a second radio, the method comprising:
   providing a first probe request in a first time slot on a first channel using the first radio, wherein the first probe request solicits a first probe response from an access point, wherein the first probe response comprises information for communication between the wireless integrated circuit package and the access point;
   receiving the first probe response in a second time slot on the first channel using the second radio, wherein the second time slot is at least partially contemporaneous with the first time slot and begins at or just after a beginning of the first time slot; and
   providing a second probe request in a third time slot on a second channel using the first radio.

2. The method of claim 1, wherein the first probe request and the second probe request are for a network of a same type, and the first radio operates in the 5 gigahertz frequency range.

3. The method of claim 2, wherein the second time slot is longer than the third time slot in time.

4. The method of claim 2, further comprising:
   receiving a second probe response in a fourth time slot on the first channel using the first radio, wherein the fourth time slot is after the third time slot.

5. The method of claim 4, wherein the second time slot is at least partially contemporaneous with the fourth time slot.

6. The method of claim 2, further comprising:
   switching the first radio from the first channel to the second channel after the first time slot and during the second time slot.

7. The method of claim 2, wherein the first channel is a 2 GHZ channel and the second channel is a 5 or 6 GHz channel.

8. The method of claim 1, wherein the second time slot is longer than the first time slot in time, wherein the second time slot is at least partially contemporaneous with the third time slot.

9. The method of claim 1, wherein the first time slot is 0.5 seconds or less.

10. A wireless device, comprising:
    a first radio;
    a second radio; and
    a processor configured to provide providing a first probe request in a first time slot on a first channel using the first radio, wherein the processor is configured to await reception of a first probe response in a second time slot on the first channel using the second radio, wherein the first probe request solicits the first probe response from an access point, wherein the first probe response comprises information for communication between the wireless device and the access point, wherein the second time slot is at least partially contemporaneous with the first time slot, wherein the processor is configured to provide a second probe request in a third time slot on a second channel using the first radio, wherein the second time slot begins at or just after a beginning of the first time slot, wherein the first radio and the second radio operate in a 2 gigahertz frequency range and a 5 gigahertz frequency range.

11. The wireless device of claim 10, wherein the processor is configured to process the first probe response in the second time slot.

12. The wireless device of claim 10, wherein the processor, the first radio and the second radio are disposed on a single substrate.

13. The wireless device of claim 10, wherein the wireless device is an 802.11 standard device using the 2 and 5 gigahertz frequency range.

14. The wireless device of claim 10, wherein the first probe request and the second probe request are for a network of a same type.

15. The wireless device of claim 14, wherein the processor is configured to receive a second probe response in a fourth time slot on the first channel using the first radio, wherein the fourth time slot is after the third time slot.

16. A method of wireless communication, the method comprising:
    providing a first probe request from a first wireless device comprising a transceiver circuit and a receiver circuit in single integrated circuit package, the first probe request being in a first time slot on a first channel using the transceiver circuit; and
    receiving a first probe response in a second time slot on the first channel using the receiver circuit wherein the first probe request solicits the first probe response from an access point, wherein the first probe response comprises information for communication between the first wireless device and the access point, wherein the second time slot at least partially overlaps the first time slot; and providing a second probe request in a third time slot on a second channel using the transceiver circuit, wherein the second time slot is at least partially contemporaneous with the first time slot and begins at or just after a beginning of the first time slot.

17. The method of claim 16, wherein the first probe request and the second probe request are for a network of a same type.

18. The method of claim 17, further comprising:
receiving a second probe response in a fourth time slot on the first channel using the transceiver circuit, wherein the fourth time slot is after the third time slot, wherein the recover circuit is part of a radio including a transmitter.

19. The method of claim 16, wherein the transceiver circuit is part of a main radio and the receiver circuit is part of a scan radio.

20. The method of claim 16, wherein the first time slot and the second time slot have the same length.

21. An apparatus, comprising:
a first radio;
a second radio; and
a circuit configured to provide providing a first probe request in a first time slot on a first channel using the first radio, wherein the circuit is configured to await reception of a first probe response in a second time slot on the first channel using the second radio, wherein the first probe request solicits the first probe response from an access point, wherein the first probe response comprises information for communication between the apparatus and the access point, wherein the second time slot at least partially overlaps the first time slot, wherein the circuit is configured to provide a second probe request in a third time slot on a second channel using the first radio, wherein the second time slot is at least partially contemporaneous with the first time slot and begins at or just after a beginning of the first time slot.

22. The apparatus of claim 21, wherein the circuit is configured to process the first probe response in the second time slot.

23. The apparatus of claim 21, wherein the circuit is an integrated circuit disposed on a single substrate, wherein the first radio and the second radio operate in the 2 gigahertz frequency range and the gigahertz frequency range.

24. The apparatus of claim 21, wherein the apparatus is an integrated circuit disposed on a single substrate in an integrated circuit package.

25. The apparatus of claim 21, wherein the circuit is a processor disposed on a single substrate.

* * * * *